US010133573B1

(12) United States Patent
Elsen et al.

(10) Patent No.: US 10,133,573 B1
(45) Date of Patent: Nov. 20, 2018

(54) MULTIVALUE REDUCTIONS USING SERIAL INITIAL REDUCTIONS IN MULTIPLE REGISTER SPACES AND PARALLEL SUBSEQUENT REDUCTIONS IN A SINGLE REGISTER SPACE

(71) Applicant: Google LLC, Mountain View, CA (US)

(72) Inventors: Erich Konrad Elsen, San Francisco, CA (US); Sander Etienne Lea Dieleman, London (GB)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/839,637

(22) Filed: Dec. 12, 2017

(51) Int. Cl.
*G06F 9/30* (2018.01)
*G06F 9/38* (2018.01)
*G06F 9/46* (2006.01)
*G06T 1/20* (2006.01)

(52) U.S. Cl.
CPC .......... *G06F 9/3009* (2013.01); *G06F 9/3001* (2013.01); *G06F 9/30098* (2013.01); *G06F 9/3885* (2013.01); *G06F 9/46* (2013.01); *G06T 1/20* (2013.01)

(58) Field of Classification Search
CPC .. G06F 9/3001; G06F 9/3009; G06F 9/30098; G06F 9/3885; G06F 9/46; G06T 1/20
See application file for complete search history.

(56) References Cited

U.S. PATENT DOCUMENTS

2013/0262835 A1* 10/2013 Arakawa ............... G06F 9/3887
712/220
2016/0124715 A1* 5/2016 Burgess .................... G06F 7/50
708/520

OTHER PUBLICATIONS

What is GPU computing, May 12, 2012, 3 pages, [retrieved from the internet on Feb. 26, 2018], retrieved from URL <www.nvidia.com/object/what-is-gpu-computing.html>.*
Mark Harris, Optimizing CUDA, Oct. 2010, 91 pages, [retrieved from the internet on Feb. 27, 2018], retrieved from URL <gpgpu.org/static/sc2007/SC07_CUDA_5_Optimization_Harris.pdf>.*
Mahesh Doijade, Parallel Reduction in CUDA, Jul. 7, 2014, 19 pages, [retreived from the internet on Feb. 28, 2017], retrieved from URL <www.techdarting.com/2014/06/parallel-reduction-in-cuda.html>.*

(Continued)

*Primary Examiner* — Jyoti Mehta
(74) *Attorney, Agent, or Firm* — Fish & Richardson P.C.

(57) ABSTRACT

Methods, systems, and apparatus, including computer programs encoded on computer storage media, for computing a multivalue reduction using a parallel processing device. One of the methods includes performing a parallel M-value reduction by parallel processing units of a parallel processing device. A plurality of initial reductions are performed in serial, each initial reduction operating on data in a different respective register space of at least M register spaces. Data is moved from the M register spaces so that all results from the plurality of initial reductions are in a same first register space. One or more subsequent reductions are performed in parallel to compute M final values, each subsequent reduction operating only on data in the first register space.

16 Claims, 8 Drawing Sheets

(56) References Cited

OTHER PUBLICATIONS

'devblogs.nvidia.com' [online] "Faster Parallel Reductions on Kepler," Feb. 13, 2014, [retrieved on Dec. 12, 2017] Retrieved from Internet: URL<https://devblogs.nvidia.com/parallelforall/faster-parallel-reductions-kepler/> 12 pages.

Harris. "NVIDIA: Optimizing Parallel Reduction in CUDA," NVIDIA Developer Technology, presentation [retrieved on Dec. 12, 2017] Retrieved from Internet: URL<http://developer.download.nvidia.com/compute/cuda/1.1-Beta/x86_website/projects/reduction/doc/reduction.pdf> 38 slides.

Owens. "GPU Reduce, Scan, and Sort," CS 223 Guest Lecture presentation, Electrical and Computer Engineering, UC Davis, [retrieved on Dec. 12, 2017] Retrieved from Internet: URL<http://web.cs.ucdavis.edu/~amenta/f15/amenta-reduce-scan-sort.pdf> 58 slides.

* cited by examiner

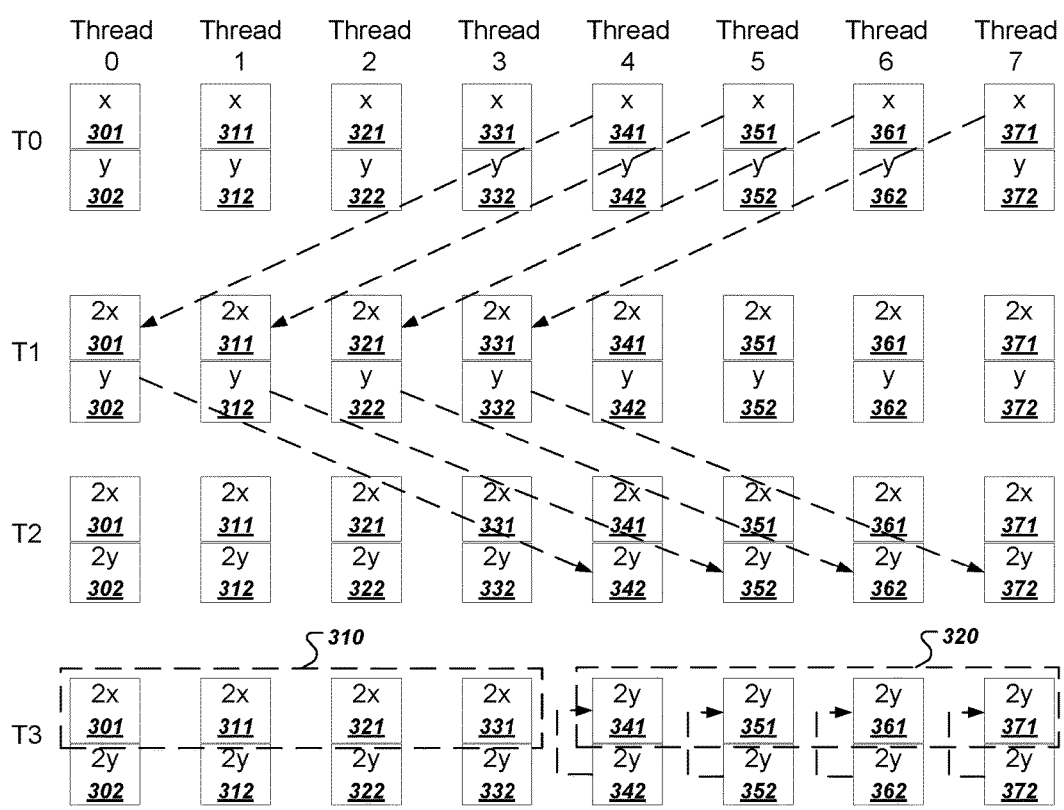

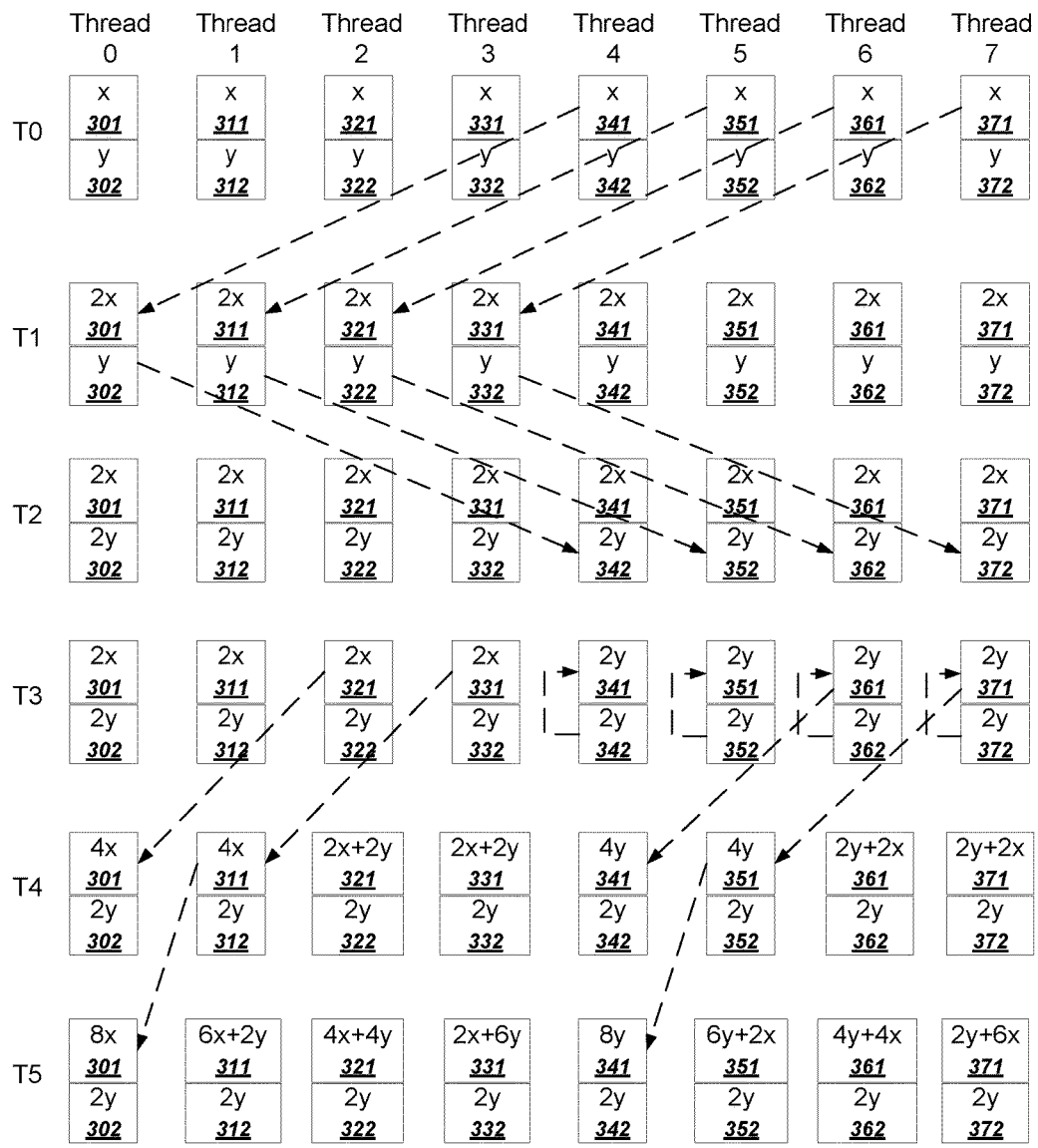

MULTIVALUE REDUCTIONS USING SERIAL INITIAL REDUCTIONS IN MULTIPLE REGISTER SPACES AND PARALLEL SUBSEQUENT REDUCTIONS IN A SINGLE REGISTER SPACE

BACKGROUND

This specification relates to techniques for efficient parallel computation of multivalue reductions using parallel processing hardware.

A reduction is an operation that combines multiple values into a single value. For example, a reduction over 8 values can be performed by computing a single sum over the 8 values. Reduction operations are commonly performed by parallel processing devices, e.g., graphics-processing units (GPUs), in order to combine data computed by multiple threads executed by multiple independent processing units of the parallel processing device. The examples described in this specification will commonly refer to the independent processing units being streaming multiprocessors (SMs) having multiple processing cores and the parallel processing device being a graphics processing unit (GPU). However, the same techniques can also be implemented on other hardware devices that implement true thread parallelization with multiple independent processing units. Such devices include single instruction, multiple data (SIMD) processors generally, tensor processing units (TPUs), or other application-specific integrated circuits. In addition, where the examples mention the use of a GPU, this does not necessarily imply that graphics data is being processed or produced.

On such parallel processing devices, control over thread parallelization can be provided by program abstractions that define how threads are assigned to be executed by the multiple independent processing units. For clarity of presentation, this specification uses the terminology of common GPU program abstractions, but equivalent program abstractions that control how threads are scheduled on independent processing units can be used for other systems that are not GPUs.

A thread block, or for brevity, a block, is a group of threads that are executed by a single SM. Threads in a block can coordinate by making use of shared memory of the SM. Communication between threads in a block is therefore typically orders of magnitude faster than communicating with threads in other blocks.

A warp is a group of threads within a block and in some cases represents the smallest assignable unit of computation for a GPU. Threads within a warp can typically read from registers assigned to other threads in the same warp. Threads in a warp also typically execute instructions in lockstep. Thus, threads within a warp can, for example, fetch data from register locations concurrently. Common warp sizes are 16, 32, or 64 threads, to name just a few examples.

The parallel processing capabilities of a parallel processing device allows single-value reductions to be performed as a series of aggregate operations by reading data in exponentially increasing or decreasing steps or skips. For example, if a warp has 8 threads, each thread can sum from its neighbor one step over, then two-steps over, and then 4 steps over. At the end of this process, one of the threads will have a sum over all values in the original data.

However, performing multivalue reductions conventionally requires the serial performance of multiple single-value reductions. This limitation is a processing bottleneck in many real-world applications that require extreme throughput requirements. For example, audio generation neural networks that model raw audio waveforms present significant computational challenges because of the basic high-throughput nature of raw audio generation. Realistic raw audio generation typically requires multiple thousands of audio samples to be generated per second, e.g., 24,000 samples per second. In such high-throughput applications, any parallel processing speedups are vital.

SUMMARY

This specification describes how a system can use parallel processing hardware to compute a multivalue reduction in parallel. That is, given M register spaces storing data to be reduced, the system can compute M final reduced values. In this specification, a "register space" is a group of corresponding registers that each belong to a different processing unit and that can all be accessed concurrently by the same instruction when executed by the threads in parallel.

Particular embodiments of the subject matter described in this specification can be implemented so as to realize one or more of the following advantages. A parallel processing device can more quickly compute multivalue reductions. A parallel processing device can take greater advantage of parallel processing capabilities by using multiple register partitions of a same register space so that at least some of the M final values can be computed in parallel.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3F illustrate an example of how a multivalue reduction can be performed for a sum aggregate operation in a warp having 8 threads.

Like reference numbers and designations in the various drawings indicate like elements.

DETAILED DESCRIPTION

Figure 1:
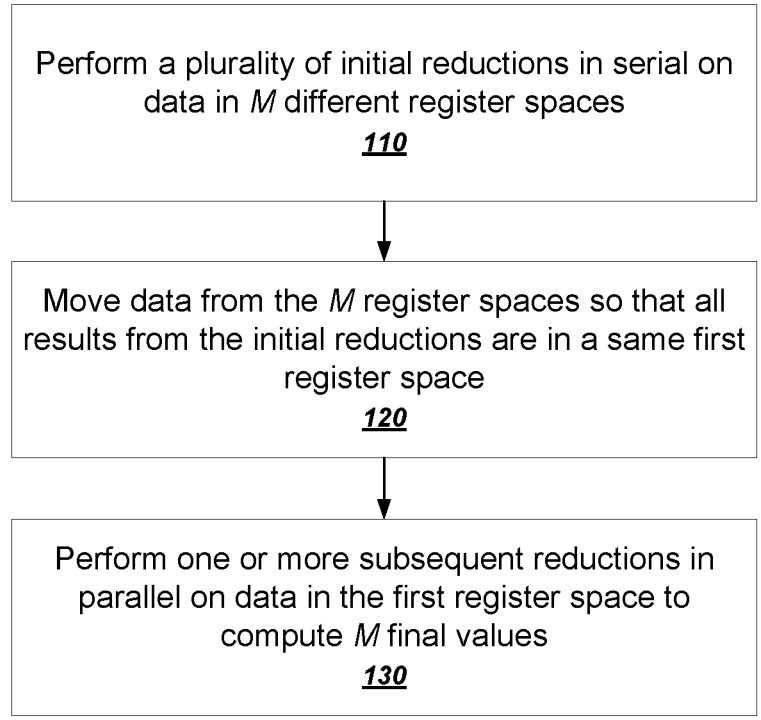
FIG. 1 is a flowchart of an example process for performing an M-value reduction using a parallel processing device.

FIG. 1 is a flowchart of an example process for performing an M-value reduction using a parallel processing device. For convenience, the example process will be described as being performed by a processing unit appropriately programmed in accordance with this specification.

The processing unit performs a plurality of initial reductions in serial on data in M different register spaces (110). In general, the starting point of the process is data existing in M different register spaces to be reduced. As described above, registers in a register space all belong to different threads and can be accessed concurrently, often with the same source code instruction. For example, the example code "val[0]" would cause all threads in a warp to read values in different registers that belong to the same register space.

In general each reduction halves the number of registers in a register space that contribute to the final result. The number of initial reductions to be performed depends on the size of threads in the warp and also on the value of M. In general, the system needs to perform enough initial reductions so that all of the remaining data to be reduced fits in the same register space of the warp.

Thus, in general the processing unit can perform a number of initial reductions until a current number j of registers storing data remaining to be reduced is less than or equal to the number N of threads in the warp. Thus, for example, if there are 8 threads in a warp and M=2, the processing unit can perform two initial reductions in serial so that 4 threads store data for one of the M values and 4 other threads store data for another one of the M values.

If M=3, for example, two initial reductions would not be sufficient because at least 12 registers would still store data remaining to be reduced. Thus, at least five initial reductions would be needed.

The processing unit moves data from the M register spaces so that all results from the plurality of initial reductions are in a same first register space (120). In general, this involves each thread moving data from one of its registers to another register. This process can be conceptualized as generating M register partitions within a single register space, where each partition is a mutually exclusive subset of registers in the register space. For example, if M=2, the processing unit can generate two partitions in a single register space. If M=3, the processing unit can generate three partitions in a single register space.

The partitions need not be the same size. For example, if M=3, the system can perform one initial reduction on one register space but two initial reductions on the other two register spaces. Then, one partition can have four registers and the other two partitions can have two registers each.

The processing unit performs one or more subsequent reductions in parallel on data in the first register space to compute M final values (130). Now that all the data is in the same register space, the system can compute the rest of the reduction in parallel.

At the end of the process, the M final values will all be stored in different registers in the register space. Therefore, if the application requires all M values to be in the same thread, the system can perform M−1 copy operations so that all M values belong to the same thread.

Figure 2:
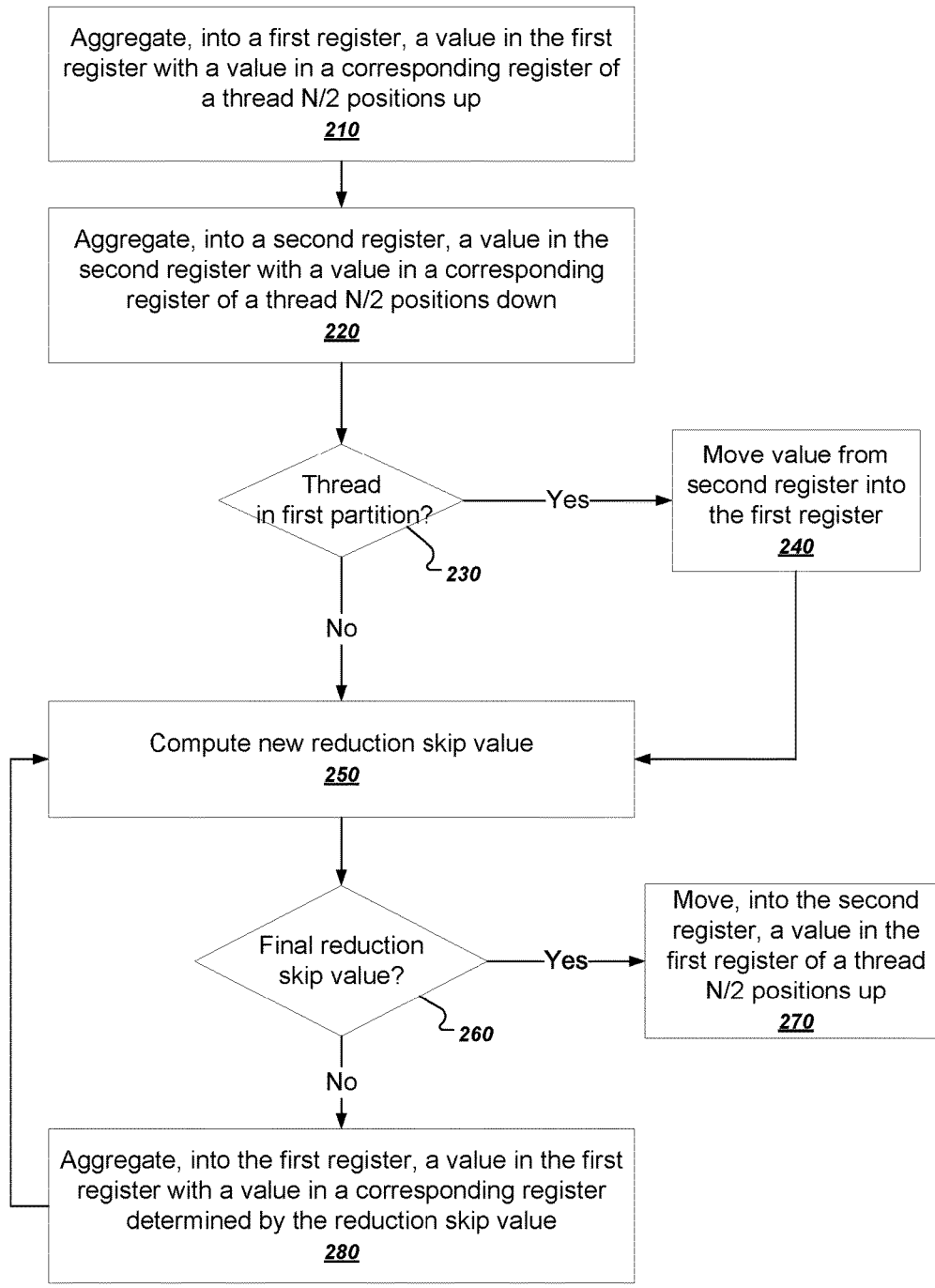
FIG. 2 is a flowchart of an example process for performing a two-value reduction in an 8-thread warp.

FIG. 2 is a flowchart of an example process for performing a two-value reduction in an 8-thread warp. The flowchart of FIG. 2 describes the steps performed from the perspective of a single thread in a warp having 8 threads. In practice, all N threads in the warp would perform the example process in parallel, although not all threads would compute the same data or follow the same paths.

The thread aggregates, into a first register, a value in the first register with a value in a corresponding register of a thread N/2 positions up (210). In other words, the thread reads a value from a register of another processing unit and aggregates the read value with a value in one of its own registers.

In order to determine which other register to read, the thread can first determine its own thread identifier. The thread can then compute the target thread identifier by adding N/2, modulo the number of threads in the warp.

In this context, the term "aggregate" broadly means any appropriate operation to performed over all values in a set of registers. Common aggregate operations include max, min, sum, and product.

Figure 3A:
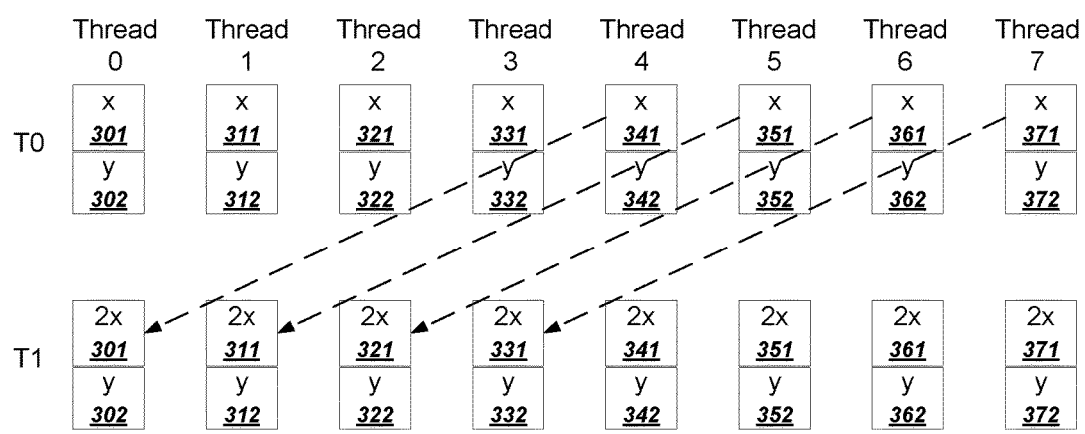

FIG. 3A illustrates an example of step 210 of FIG. 2. FIGS. 3A-3F generally illustrate an extended example of how a multivalue reduction can be performed for a sum aggregate operation in a warp having 8 threads, thread 0 through thread 7.

This example assumes that the threads in a warp all start out at time T0 with a first value of "x" in a first register, and a second value of "y" in a second register. Thus, registers 301, 311, 321, 331, 341, 351, 361, and 371 start out with a value of "x," and registers 302, 312, 322, 332, 342, 352, 362, and 372 start out with a value of "y."

The sum aggregate operation will sum all the x's and also sum all the y's together such that the results are stored in the registers belonging to a single thread.

As shown in FIG. 3A, between time T0 and T1, thread 0 performs an aggregation operation between a value stored in the register 301 and a value stored in a corresponding register for thread number 0+8/2=thread 4. The aggregation operation, in this case, a sum, results in the value 2x being stored in the register 301.

Similarly, the value 2x is also computed and stored in every other corresponding register 301, 311, 321, 331, 341, 351, 361, and 371. In the example illustrated by FIGS. 3A-3F, dotted lines are used to illustrate only data movements that contribute to the final multivalue reduction. Thus, for example, while threads 4-7 will also compute the value "2x" and store it in registers 341, 351, 361, and 371, these values are included in the figure for completeness sake but will not actually contribute anything to the final result.

As shown in FIG. 2, the thread aggregates, into a second register, a value in the second register with a value in a corresponding register of a thread N/2 positions down (120). In other words, the thread reads a value from a register of another thread and aggregates the read value with a value in one of its own registers. To determine which other register to read, the thread can compute the target thread identifier by subtracting N/2, modulo the number of threads in the warp.

Figure 3B:
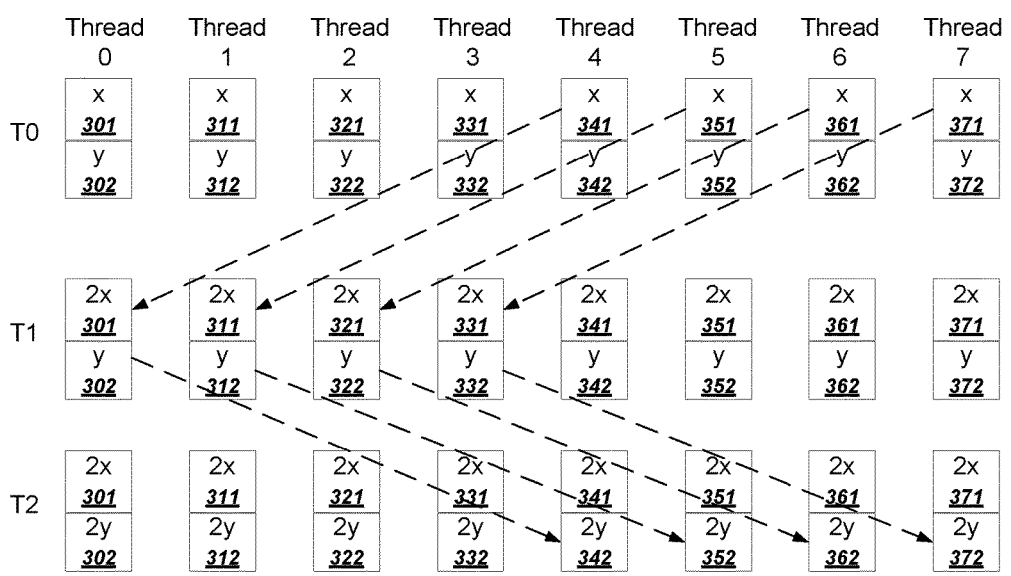

FIG. 3B illustrates an example of step 220 of FIG. 1. Between time T1 and T2, thread 4 performs an aggregation operation between a value stored in the register 342 and a value stored in a corresponding register for thread number 4−8/2=thread 0. The aggregation operation results in the value 2y being stored in the register 342.

Similarly, the value 2y is also computed and stored in every other corresponding register 302, 312, 322, 332, 342, 352, 362, and 372. However, only the last four values will actually contribute to the final result.

The aggregation operations of steps 210 and 220 are sometimes supported by a single instruction of a particular instruction set architecture for the parallel processing device. For example, in some GPUs, the first aggregation operation can be implemented using a "shuffle down" instruction, and the second aggregation operation can be implemented using a "shuffle up" instruction.

As shown in FIG. 2, the thread determines whether or not it is in a first partition (230). As described above, a register space can be partitioned in any appropriate way such that one partition is assigned to compute each value of a multivalue reduction operation. When there are only two values to be aggregated over, the partitioning scheme can assign half the threads to each value.

This decision point in step 230 essentially determines whether or not the thread needs to move data from one register space to another. In some cases, the thread's data is already in the target register space, so no data movement is necessary.

Thus, if the thread is in the first partition, the thread moves a value from the second register to the first register (branch to 240). Otherwise, this step is simply skipped (branch to 250).

FIG. 3C illustrates an example of steps 230 and 240 of FIG. 2. Between time T2 and T3, only threads 4-7 move data. Thread 4, for example, moves the value 2y from the register 342 to the register 341. Similarly, other threads make corresponding movements into registers 351, 361, and 371.

At this point, the register space defined by registers 311, 321, 331, 341, 351, 361, and 371 are effectively divided into two register partitions 310 and 320. Half the registers, e.g., 301, 311, 321, and 331, form a first register partition 310 for a first value, e.g., 2x, while the other half of the registers, e.g., 341, 351, 361, and 371, form a second register partition 320 for a second value, e.g., 2y.

As shown in FIG. 2, the system computes a new reduction skip value (250). The reduction skip value is used to control which registers the thread should read from on each iteration of the reduction. In general, the reduction skip value changes exponentially. The skip value can either get larger, e.g., 1, 2, 4, 8, etc.; or get smaller, e.g., 8, 4, 2, 1.

The system determines whether the reduction skip value is a final skip value. The final skip value generally depends on the number of threads in the largest register partition. For this example, where there are four threads in the initial partitions, the reduction skip value is initially 2, then 1, with 1 being the final reduction skip value.

If the final reduction skip value has not been reached (260), the thread aggregates, into the first register, a value in the first register with a value in a corresponding register determined by the reduction skip value (branch to 280).

Figure 3D:
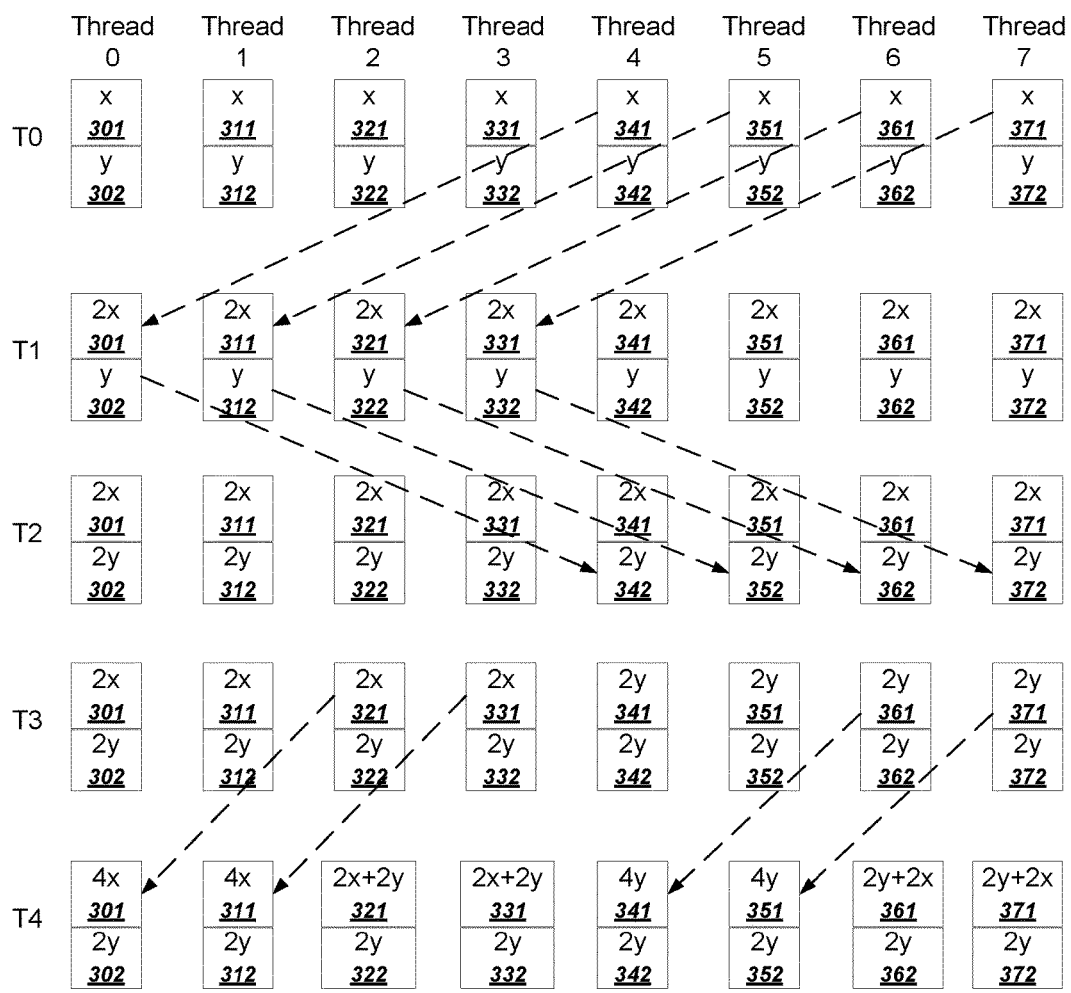

FIG. 3D illustrates an example of step 280. Thread 0, for example, aggregates a value in the register 301 with a value in the register 321, which is determined by a reduction skip value of 2. Similarly, thread 4 aggregates a value in the register 341 with a value in the register 361, which is determined by a reduction skip value of 2.

FIG. 3E illustrates the next iteration through step 280. At this point, the reduction skip value is 1. Thus, thread 0, for example, aggregates a value in the register 301 with a value in register 311, which is determined by the reduction skip value of 1. And thread 4 aggregates a value in the register 341 with a value in the register 351, which is also determined by the reduction skip value of 1.

As shown in FIG. 2, if the reduction skip value is a final reduction skip value (260), the thread moves, into the second register, a value in the first register of a thread N/2 positions up (branch to 270). In other words, the thread copies the final reduction value from the second partition so that a single thread has all of the M reduced values.

Figure 3F:
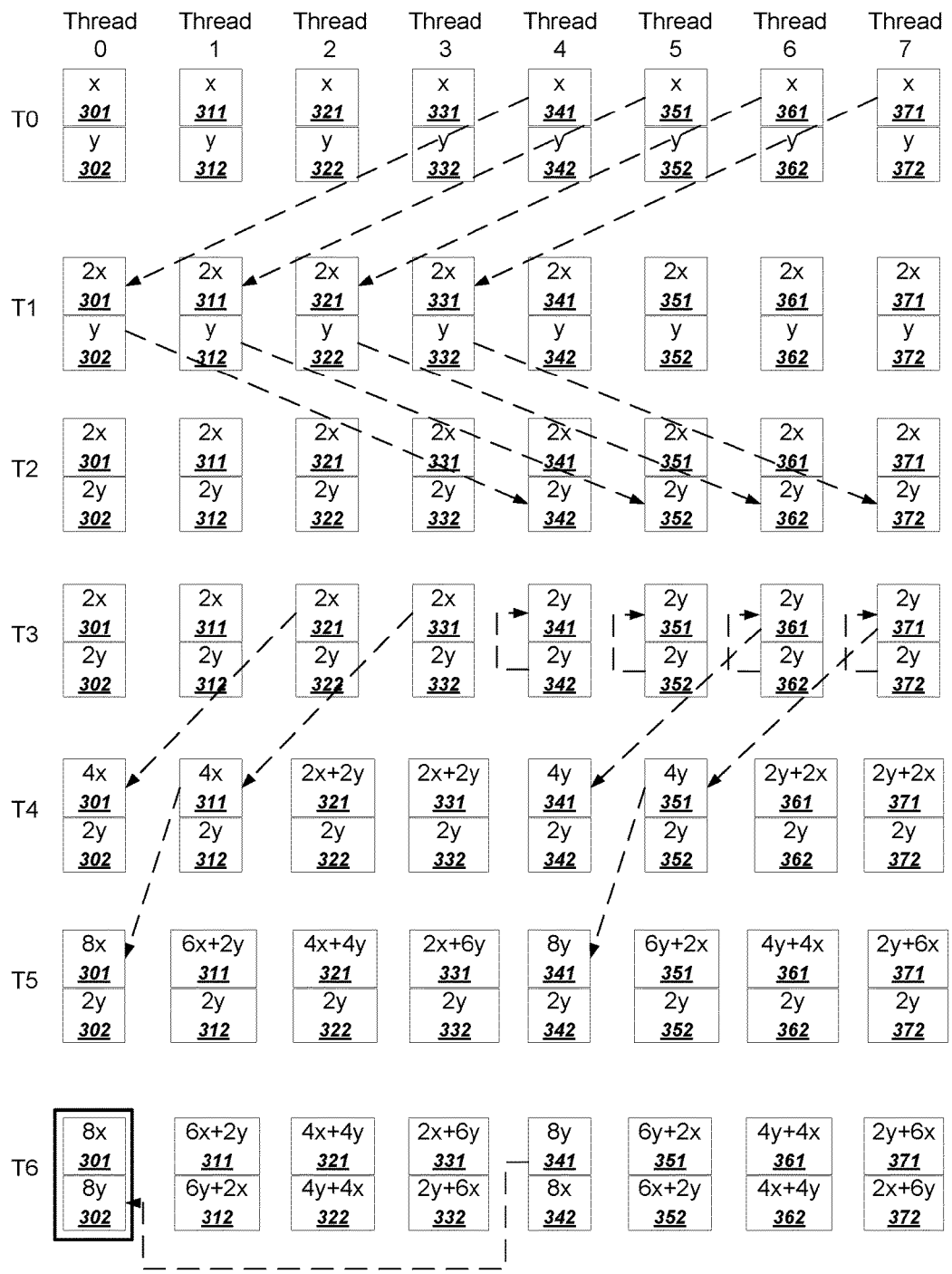

FIG. 3F illustrates step 270. Thread 0 copies the final value computed by threads in the second partition stored with thread 4 into a different register space. Therefore, at this point in the process, thread 0 has all values for the M-value reduction operation.

For simplicity, this example assumed only 8 threads in a warp. However, modern GPUs typically have many times that number of threads in a warp, e.g., 32 or 64 threads in a warp. For example, if there are 32 threads in a warp, it would take 10 steps to perform a 2-value reduction using conventional techniques, but only 6 steps using the techniques described above. For 64 threads in a warp, it would take 12 steps to perform the 2-value reduction, but only 7 steps using the techniques described above.

In this specification, performing operations in parallel or substantially in parallel means that different threads or independent processing units perform the operations over time windows that at least partially overlap. Performing operations in parallel or substantially in parallel does not require all values to be computed at precisely the same time or in lockstep.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers.

The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method for performing a parallel M-value reduction by parallel processing units of a parallel processing device, the method comprising:

performing a plurality of initial reductions in serial, each initial reduction operating on data in a different respective register space of at least M register spaces;

moving data from the M register spaces so that all results from the plurality of initial reductions are in a same first register space; and performing one or more subsequent reductions in parallel to compute M final values, each subsequent reduction operating only on data in the first register space.

Embodiment 2 is the method of embodiment 1, wherein the parallel processing device is a graphics processing unit.

Embodiment 3 is the method of any one of embodiments 1-2, further comprising moving each result of the one or more subsequent reductions into respective registers of a same parallel processing unit.

Embodiment 4 is the method of any one of embodiments 1-3, wherein performing the plurality of initial reductions in serial comprises:

performing a shuffle down operation followed by performing a shuffle up operation or vice versa.

Embodiment 5 is the method of any one of embodiments 1-4, wherein each initial reduction reduces the number of registers storing data that contribute to the M final values, and wherein performing the plurality of initial reductions comprises performing a number of initial reductions such that M times a current number j of registers storing data that contribute to the M final values to be reduced is less than or equal to a number N of threads in the warp.

Embodiment 6 is the method of embodiment 5, wherein each reduction halves the number of registers storing data that contribute to one of the M final values.

Embodiment 7 is the method of any one of embodiments 1-6, wherein moving data from the M register spaces so that all results from the plurality of initial reductions are in a same first register space comprises moving data that contributes to different final values into different register partitions.

Embodiment 8 is the method of embodiment 7, wherein each register partition is a mutually exclusive subset of registers in a same register space.

Embodiment 9 is the method of embodiment 8, wherein each register space is a group of corresponding registers that each belong to a different processing unit and that can all be accessed concurrently by the same instruction when executed by the processing units in parallel.

Embodiment 10 is a parallel processing device comprising a plurality of parallel processing units, the parallel processing device being configured to execute instructions that cause the parallel processing device to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A parallel processing device comprising a plurality of parallel processing units, the parallel processing device being configured to execute instructions that cause the parallel processing device to perform operations comprising:

receiving a request to perform a multivalue reduction to compute M final reduction values from initial values stored in M initial register spaces of the plurality of parallel processing units, wherein each of the M initial register spaces stores N initial values to be reduced into a respective final reduction value of the M final reduction values;

performing, by the parallel processing units, a plurality of initial partial reductions in serial, each initial partial reduction operating on data in a different respective register space of the M initial register spaces, wherein each initial partial reduction reduces a number of registers storing data that contributes to the M final reduction values, and wherein after performing the plurality of initial partial reductions, a current number j of registers storing data that contributes to the M final reduction values is less than or equal to a number N of threads that are executed in parallel by the parallel processing units;

moving, by each of one or more of the parallel processing units, a respective value computed by one or more of the initial partial reductions into a same first register space so that all values contributing to the M final reduction values computed from the plurality of initial partial reductions are stored in the same first register space; and performing, by the parallel processing units, a plurality of subsequent reductions in parallel on values stored in the first register space to compute the M final reduction values, wherein each of the M final reduction values is a respective reduction of respective data stored in the M initial register spaces.

2. The parallel processing device of claim 1, wherein the parallel processing device is a graphics processing unit.

3. The parallel processing device of claim 1, wherein the operations further comprise moving one or more of the M final reduction values into respective registers of a same parallel processing unit.

4. The parallel processing device of claim 1, wherein performing the plurality of initial partial reductions in serial comprises:

performing, by each of the parallel processing units, a shuffle down operation followed by performing a shuffle up operation or vice versa.

5. The parallel processing device of claim 1, wherein each initial partial reduction comprises one or more iterations and each iteration of the one or more iterations halves the number of registers storing data that contributes to one of the M final reduction values.

6. The parallel processing device of claim 1, wherein moving the values computed by one or more of the initial partial reductions comprises moving values computed by each respective initial partial reduction that contribute to one of the M final reduction values into different respective register partitions.

7. The parallel processing device of claim 6, wherein each register partition is a mutually exclusive subset of registers in a same register space.

8. A method for performing a parallel M-value reduction by a plurality of parallel processing units of a parallel processing device, the method comprising:

receiving a request to perform a multivalue reduction to compute M final reduction values from initial values stored in M initial register spaces of the plurality of parallel processing units, wherein each of the M initial register spaces stores N initial values to be reduced into a respective final reduction value of the M final reduction values;

performing, by the parallel processing units, a plurality of initial partial reductions in serial, each initial partial reduction operating on data in a different respective register space of the M initial register spaces, wherein each initial partial reduction reduces a number of registers storing data that contributes to the M final reduction values, and wherein after performing the plurality of initial partial reductions, a current number j of registers storing data that contributes to the M final reduction values is less than or equal to a number N of threads that are executed in parallel by the parallel processing units;

moving, by each of one or more of the parallel processing units, a respective value computed by one or more of the initial partial reductions into a same first register space so that all values contributing to the M final reduction values computed from the plurality of initial partial reductions are stored in the same first register space; and performing, by the parallel processing units, a plurality of subsequent reductions in parallel on values stored in the first register space to compute the M final reduction values, wherein each of the M final reduction values is a respective reduction of respective data stored in the M initial register spaces.

9. The method of claim 8, wherein the parallel processing device is a graphics processing unit.

10. The method of claim 8, further comprising moving one or more of the M final reduction values into respective registers of a same parallel processing unit.

11. The method of claim 8, wherein performing the plurality of initial partial reductions in serial comprises:
performing, by each of the parallel processing units, a shuffle down operation followed by performing a shuffle up operation or vice versa.

12. The method of claim 8, wherein each initial partial reduction comprises one or more iterations and each iteration of the one or more iterations halves the number of registers storing data that contributes to one of the M final reduction values.

13. The method of claim 8, wherein moving the values computed by one or more of the initial partial reductions comprises moving values computed by each respective initial partial reduction that contribute to one of the M final reduction values into different respective register partitions.

14. The method of claim 13, wherein each register partition is a mutually exclusive subset of registers in a same register space.

15. One or more non-transitory computer storage media encoded with program instructions that when executed by a parallel processing device comprising a plurality of parallel processing units cause the parallel processing device to perform operations comprising:

receiving a request to perform a multivalue reduction to compute M final reduction values from initial values stored in M initial register spaces of the plurality of parallel processing units, wherein each of the M initial register spaces stores N initial values to be reduced into a respective final reduction value of the M final reduction values;

performing, by the parallel processing units, a plurality of initial partial reductions in serial, each initial partial reduction operating on data in a different respective register space of the M initial register spaces, wherein each initial partial reduction reduces a number of registers storing data that contributes to the M final reduction values, and wherein after performing the plurality of initial partial reductions, a current number j of registers storing data that contributes to the M final reduction values is less than or equal to a number N of threads that are executed in parallel by the parallel processing units;

moving, by each of one or more of the parallel processing units, a respective value computed by one or more of the initial partial reductions into a same first register space so that all values contributing to the M final reduction values computed from the plurality of initial partial reductions are stored in the same first register space; and performing, by the parallel processing units, a plurality of subsequent reductions in parallel on values stored in the first register space to compute the M final reduction values, wherein each of the M final reduction values is a respective reduction of respective data stored in the M initial register spaces.

16. The one or more non-transitory computer storage media of claim 15, wherein the program instructions are executable by a graphics processing unit.

* * * * *